US008286181B2

(12) United States Patent
Daute

(10) Patent No.: US 8,286,181 B2
(45) Date of Patent: Oct. 9, 2012

(54) SUPPORTING ADMINISTRATION OF A MULTI-APPLICATION LANDSCAPE

(75) Inventor: Oliver Daute, Dusseldorf (DE)

(73) Assignee: SAP AG, Walldorf (DE)

( * ) Notice: Subject to any disclaimer, the term of this patent is extended or adjusted under 35 U.S.C. 154(b) by 588 days.

(21) Appl. No.: 12/533,163

(22) Filed: Jul. 31, 2009

(65) Prior Publication Data

US 2011/0029986 A1 Feb. 3, 2011

(51) Int. Cl.
*G06F 9/46* (2006.01)
*G06Q 10/00* (2012.01)

(52) U.S. Cl. ........ 718/106; 718/100; 718/101; 718/102; 705/7.12; 705/7.26

(58) Field of Classification Search ........................ None
See application file for complete search history.

(56) References Cited

U.S. PATENT DOCUMENTS

| 2002/0032590 | A1* | 3/2002 | Anand et al. ............... 705/7 |
| 2002/0038228 | A1* | 3/2002 | Waldorf et al. ............. 705/7 |
| 2008/0215389 | A1* | 9/2008 | Heidasch .................... 705/7 |
| 2010/0280863 | A1* | 11/2010 | Wilcock et al. ............. 705/7 |

OTHER PUBLICATIONS

'Optimizing Business Performance with Business Process Management' [online]. Bruce Silver Associates, 2006, [retrieved on Jul. 31, 2009]. Retrieved from the Internet: <URL: software.ibm.com/software/integration/wbimodeler/library/whitepapers/bio-whitepaper.pdf>, 13 pages.
'The BMC MAINVIEW Advantage' [online]. BMC Software, 2005-2009, [retrieved on Jul. 31, 2009]. Retrieved from the Internet: <URL: documents.bmc.com/products/documents/44/30/104430/104430.pdf>, 20 pages.
'HP Open View Business Process Insight, Concept and Modeling Flows, Software Version: 02.00' [online]. Hewlett-Packard, 2006, [retrieved on Jul. 31, 2009]. Retrieved from the Internet: <URL: ovrd.external.hp.com/rd/sign-in?TYPE=33554433&REALMOID=06-000dbac2-dc02-1680-9aa0-a14d91440000&GUID=&SMAUTHREASON=0&METHOD=GET&SMAGENTNAME=$SM$i%2bVqGd4Zrg0nzFPTAbCG%2fQrn0f2UZowYfT2RitHvQEb1t1q1Fq3Rt65IHxgfcRnD&TARGET=$SM$HTTP%3a%2f%2fsupport %2eopenview%2ehp%2ecom%2fselfsolve%2fdocument%2fKM14861%2fbinary%2fBPI_20_Concepts_pdf%3fsearchIdentifier%3d29176554$%3a122cdd73cd9$%3a-72c9%26resultType%3ddocument>, 148 pages.
'The Instantly Responsive Enterprise: Integrating Business Process Management and Complex Event Processing' [online]. Oracle, 2008, [retrieved on Jul. 31, 2009]. Retrieved from the Internet: <URL: www.oracle.com/technologies/bpm/docs/instantly-responsive-enterprise-whitepaper.pdf>, 7 pages.
'SAP Ushers in New Era for Business Process Management' [online]. SAP, 2008, [retrieved on Aug. 3, 2009]. Retrieved from the Internet: <URL: sap.com/about/newsroom/press.epx?pressid=9452>, 4 pages.
'Next Generation BPM with SAP NetWeaver Composition Environment' [online]. SAP, 2008, [retrieved on Aug. 3, 2009]. Retrieved from the Internet: <URL: www.sdn.sap.com/irj/scn/index?rid=/library/uuid/f061722f-e4c9-2b10-52b1-9c2ceb955385&overridelayout=true>, 21 pages.

* cited by examiner

*Primary Examiner* — Meng An
*Assistant Examiner* — Bing Zhao
(74) *Attorney, Agent, or Firm* — Fish & Richardson P.C.

(57) ABSTRACT

A computer-implemented method for supporting administration of a multi-application landscape includes initiating, in a multi-application computer system, a business process that involves executing multiple applications and uses run control statements associated with process steps of the business process where a business process state is subject to change. The run control statements are executed as part of performing the business process. For each run control statement being executed, at least one of multiple state indicators associated with the run control statement is selected, the state indicator representing run-state information of the business process. A representation of the business process state is generated and stored in a repository, the representation comprising (i) each state indicator selected in executing the run control statements, and (ii) an identifier for the process step where the business process state changed.

20 Claims, 6 Drawing Sheets

```
500

RunControl (BC1.PS1, "active")              506A
call function PurchaseOrder;                502
if return code <> 0 then        ⎫
    call ExceptionHandling;     ⎬ 504
    RunControl (BC1.PS1, "exception")        506B
end
RunControl (BC1.PS1, "successful")          506C
```

```
RunControl (BC1.PS1, "active")          ~506A
call function PurchaseOrder;            ~502
if return code <> 0 then        }504
  call ExceptionHandling;
  RunControl (BC1.PS1, "exception")     ~506B
end
RunControl (BC1.PS1, "successful")      ~506C
```

FIG. 5

SUPPORTING ADMINISTRATION OF A MULTI-APPLICATION LANDSCAPE

TECHNICAL FIELD

This document relates to information processing.

BACKGROUND

System maintenance is an area of continuous concerns for owners and administrators of enterprise business systems. Approaches have been used in the past to maintain or restore a system after a failure or crash. New challenges can also arise, for example due to the use of linked up software applications that implement business scenarios. In some systems, multiple business processes exchange data across complex application landscapes, and use various applications and data computations for this purpose. It is important that the underlying technology provide a stable environment for maintaining diverse software, databases and operating system components. One challenge for the administrator/owner is to keep the application environment under control at any given time. The goal is usually to avoid incidents to business processes and to sustain the application landscape with regard to smaller and larger changes. When parts of a system environment are to be restored after a breakdown, for example, this task can be complicated without detailed information about states of system components at the time of the incident.

SUMMARY

In a first aspect, a computer-implemented method for supporting administration of a multi-application landscape includes initiating, in a multi-application computer system, a business process that involves executing multiple applications and uses run control statements associated with process steps of the business process where a business process state is subject to change. The method includes executing the run control statements as part of performing the business process. The method includes, for each run control statement being executed, selecting at least one of multiple state indicators associated with the run control statement, the state indicator representing run-state information of the business process. The method includes generating a representation of the business process state and storing the representation in a repository, the representation comprising (i) each state indicator selected in executing the run control statements, and (ii) an identifier for the process step where the business process state changed.

Implementations can include any or all of the following features. The multi-application computer system can include a hardware layer, a software layer, and a business process layer. The method can further include defining inter-dependencies of business cases associated with the business process layer, the business cases including multiple process steps and sub-process steps performed throughout the multi-application landscape to fulfill enterprise tasks. The run control statements can be included in source code of applications of the software layer. The run control statements can be included in a batch processing mechanism, the batch processing mechanism comprising starting and stopping applications of the software layer. The run-state information can include a state and a time of the business process. The repository can include a business case directory table, an active business case table, and a run-time history table. The business case directory table can include representations of a process owner, a process unit, and a process dependency, the active business case table can include representations of the state indicators and the identifiers for active business processes, and the run-time history table can include representations of the run-state information of completed business processes. Storing the representation in the repository can include initiating an agent that collects the state indicators and sends the state indicators to the repository. The multi-application computer system can include a hardware layer, a software layer, and a business process layer, and the agent can collect the state indicators from at least one of the hardware layer, the software layer, and the business process layer. The agent can evaluate at least one of XML, log files, and extracts of application tools from the hardware layer and the software layer, and can receive the state indicators from a call of the run control statement from the business process layer. The method can further include monitoring the repository for business process state changes. The monitoring can include displaying the representations of the business process states and performing maintenance on the multiple applications of the business process.

The method can be implemented using a computer program product tangibly embodied in a computer-readable storage medium and including instructions that when executed by a processor perform the method.

The details of one or more implementations are set forth in the accompanying drawings and the description below. Other features and advantages will be apparent from the description and drawings, and from the claims.

DESCRIPTION OF DRAWINGS

FIG. 5 shows an example of code having a run control statement.

Like reference symbols in the various drawings indicate like elements.

DETAILED DESCRIPTION

Figure 1:
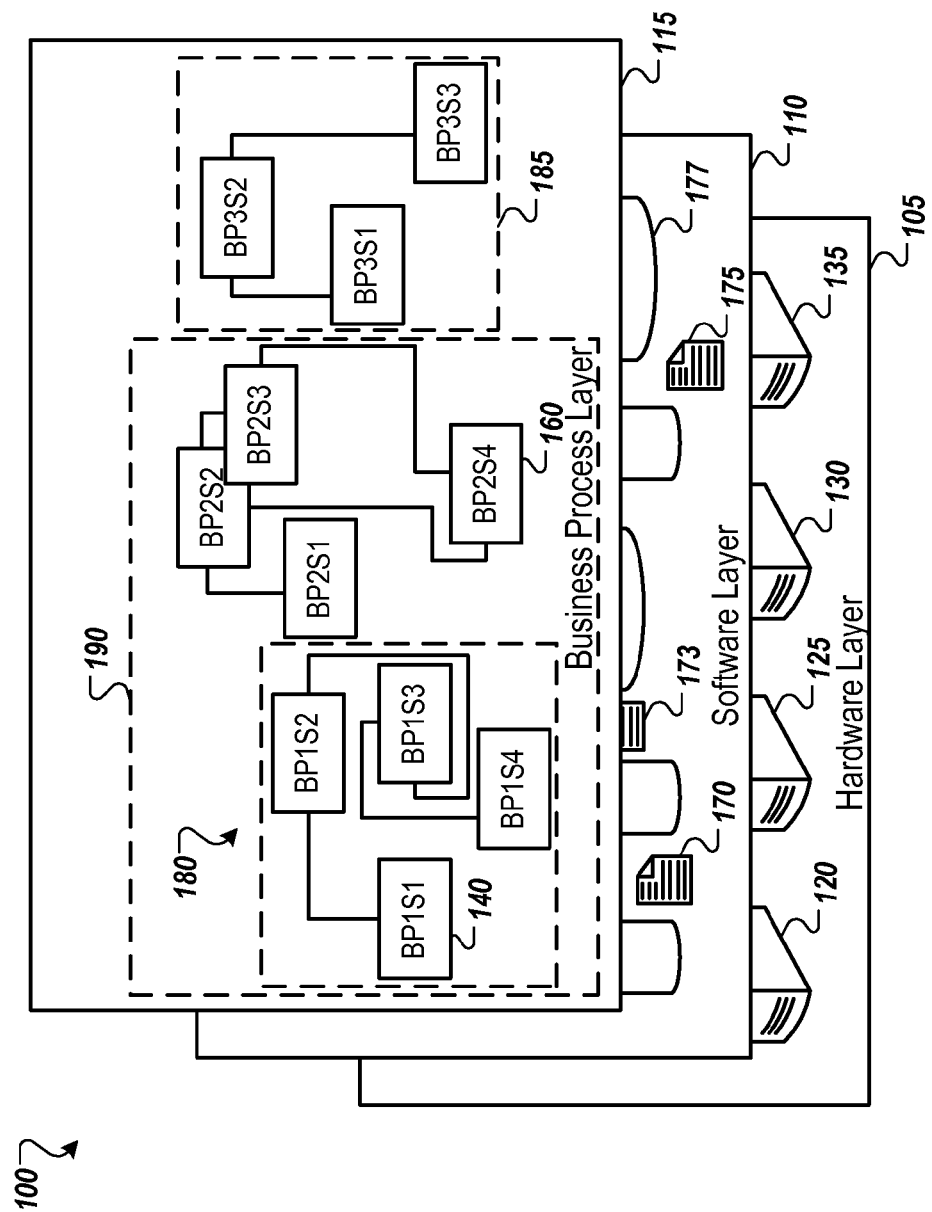
FIG. 1 is a block diagram of a multi-application landscape.

FIG. 1 shows a multi-application landscape 100 including at least a hardware layer 105, a software layer 110, and a business process layer 115. Each layer may function across one or more physical locations throughout a business enterprise and may operate on various systems of the enterprise. The hardware layer 105 includes physical components upon which applications of the software layer 110 run. The business process layer 115 combines functions of the hardware layer 105 and software layer 110 to perform enterprise-related business process tasks, such as invoicing. For example, a system configured to perform enterprise resource planning (ERP) services can be implemented using layers such as these. A Real-Time Business Case Database ("RT-BCDB") described in examples herein can collect and provide information about some or all of the layers to support administration of the multi-application landscape 100. Additional examples regarding RT-BCDB are described in the article "Introducing Real-Time Business Case Database" by Oliver Daute, published at the 2009 International Conference on Enterprise Information Systems (ICEIS), the entire contents of which article are incorporated herein by reference.

The business process layer 115 combines the software layer 110 and hardware layer 105 to achieve enterprise solutions. The business process layer 115 may include business processes 190 comprised of business cases 180, 185. A business case 180, 185 describes a procedure of activities to fulfill enterprise tasks. A business case 180, 185 may consist of several process steps 140 which can be performed on different systems, and a process step 140 itself may be comprised of sub-process steps. A business process 190 is a collection of business cases 180, 185, interconnecting multiple process steps 140 of business cases 180, 185. A business process 190 may consume or calculate data and can invoke maintenance services. Examples of business processes 190 include enterprise product ordering, invoicing, inventory management, financial transactions, and the like.

The hardware layer 105 performs the functions of processing, server tasks such as file sharing, memory storage, network interconnect, and the like. The hardware layer 105 may include one or more servers 120, 125, 130, 135, processing components, circuit boards, storage components, network components, and the like. The hardware layer 105 may be configured in any type of arrangement, including client-server, service-oriented, IT service management architectures, and the like. The hardware layer 105 is here the lowest layer, and is connected to the software layer 110 through software applications running on the hardware components. The business process layer 115 combines multiple hardware and software layer components into business processes 190, where each business process may use a different combination of components on the hardware layer 105 and the software layer 110.

For instance, business process step BP1S1 140 may require functionality from server 120 and server 125, while business process step BP2S4 160 may require functionality from server 130 and server 135. On the hardware layer 105, information about progress of a process can be found in log files. Applications can write processing messages into these log files. These messages may reflect the current state of the hardware and can be used to determine business process run-state information. An advantage of determining business process run-state information in this manner is that less effort is required to set up the monitoring because the hardware log files are already typically in place within a multi-application landscape 100.

The software layer 110 is a higher layer than the hardware layer 105 and lower than the business process layer 115. The software layer 110 may contain application programs 170, 173, 175 for performing software functions, database systems 177 for storing information, tools to exchange data across the multi-application landscape 100, and the like. The software layer 110 may be configured in any type of arrangement, including client-server, service-oriented, or IT service management architectures, and the like. The software layer 110 may use any of a variety of software languages, such as C++, Java, COBOL, to name a few. The software layer performs sub-process steps that make up the process steps 140 of business processes within the business process layer. Applications 170, 173, 175 and databases 177 of the software layer 110 may have their own monitoring tools to measure activities and make them visible. These monitoring tools may be used to check for intensive data load, monitor processes, prove the parallelization of user work, and the like. Data produced by these monitoring tools may be extracted to XML or log files within the software layer 110, and these files may be used to identify run-states of process activities on the business process layer 115. An advantage of determining run-state information using the software layer 110 is that little development work needs to be done.

As will be described below, information of run-states of active business processes 190 may be collected and stored synchronously. Such information may support system maintenance activities and may assist administration during failure recovery. This improves planning, changing, and optimizing the multi-application landscape 100. To achieve these improvements, the system may provide knowledge about the business processes 190 and their dependencies within the multi-application landscape 100.

As shown in FIG. 1, a single business process 190 can invoke process activities across part of, or the whole multi-application landscape 100 on more than one server 120, 125, 130, 135, and use different applications and exchange data from the software layer 110. For instance, if a server 120 fails or a database 177 stops processing, then one or more business processes 190 can be affected. As will be described in examples below, to determine the impact to process activities across the enterprise and to recover in such a scenario, the system can provide information about run-states, dependencies, and other useful data for maintenance activities.

Figure 2:
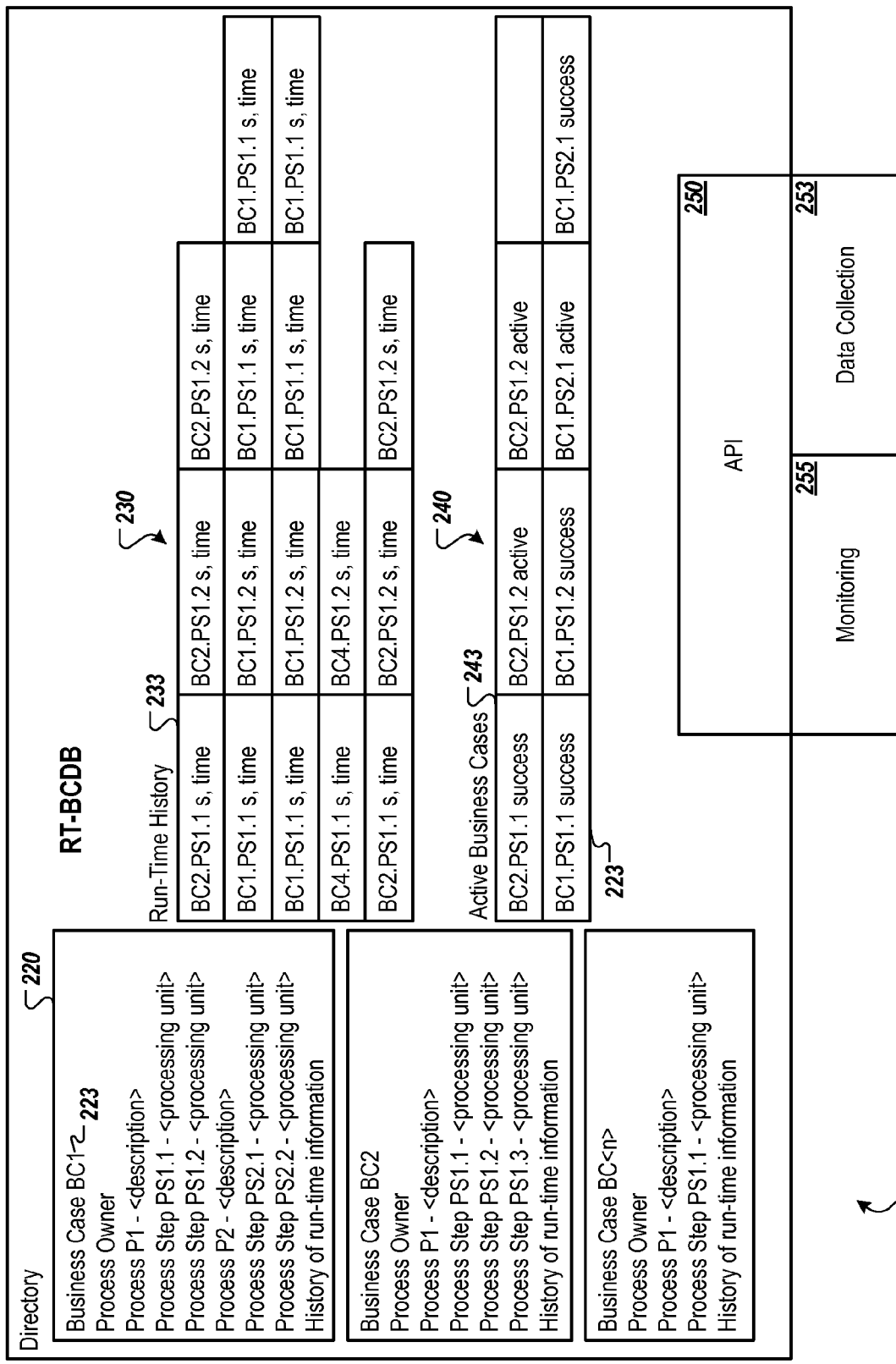
FIG. 2 shows an exemplary embodiment of a business case database.

Referring now to FIG. 1 and FIG. 2, an exemplary embodiment of an RT-BCDB 200 for supporting administration of the multi-application landscape 100 will be described. Here, an architecture for the RT-BCDB is illustrated. RT-BCDB can include a database for collecting information about business processes 190 of the multi-application landscape 100. The RT-BCDB 200 may include a directory 220, a run-time history table 230, an active business cases table 240, and an application programming interface ("API") 250.

The directory 220 is here a list within the RT-BCDB 200 that provides information such as system owners for business cases, processes, processing units, process steps, process owners, dependencies, to name a few examples. Each business case 180, 185 may be associated with an identifier 223 so that when the business case 180, 185 appears in another location within the RT-BCDB 200 it can be referenced to find more information. For example, whenever a business case 180, 185 is active its identifier 223 can be found in the active business case table 240 and the user can check it against the directory 220 for more information. This information could include, among other items, the systems of the multi-application landscape 100 upon which the business cases 180, 185 rely. Knowing the system where the business case 180, 185 or related processing is performed can be important to improving maintenance of the multi-application landscape 100.

The run-time history table 230 is here a table within the RT-BCDB 200 that stores executions of business processes 190. Each row of the table 230 may be associated with a terminated business case 180, 185. An entry of the run-time history table 230 may describe the business case 180, 185, its process activity, the state of termination of the business case 180, 185, and the time it took the business case 180, 185 to execute from start to termination, or its "run-time." A run-time history table 230 is not limited to this information, but may comprise any information relevant to understanding the business case 180, 185 process step 140 for supporting maintenance of the multi-application landscape 100. As one example, a "BC2.PS1.1 s, time" entry 233 could represent process step 1 of process 1 of business case 2, where business case 2 terminated with state "s" (successfully) and in "time" milliseconds.

The active business case table 240 is another table within the RT-BCDB 200. The active business case table 240 here stores run-states of business cases 180, 185 that are currently running in the multi-application landscape 100 to provide real-time capabilities for business processes 190 maintenance. Each entry in the active business case table 240 may represent the state of the process step 140 of any currently active business case 180, 185. As one example, a "BC.2PS.1.1 success" entry 243 could represent process step 1 of process 1 of business case 2 which has a run-state of "success." Other examples of run-states that could be found within the active business case table 240 include "active," "stopped," "abort," "wait," and others depending on the business processes states being stored in the RT-BCDB 200.

The API 250 is the interface for data collection 253 and monitoring 255 between the RT-BCDB 200 and one or more layers of the multi-application landscape 100. API data collection 253 may be performed by one or more agents. The agents can collect information of run-states from one or more of the hardware 105, software 110, and business process 115 layers. The agents can then write the collected run-state information along with any other desired information into the table of active business cases 240. In one exemplary embodiment, the agents could be implemented through script or other software files executed within an operating system or other application on the software layer 110. In another exemplary embodiment, the agents could be implemented at the business process layer 115 by requiring business cases process steps 140 to use agents at various points within their execution to collect run-state information.

API monitoring 255 communicates the RT-BCDB 200 information to third parties so that system maintenance may be performed. The API monitoring 255 may connect to third party applications for representing the RT-BCDB 200 information in the form of available business cases 180, 185, the progress or states of business cases 180, 185, and any other information required to perform system maintenance, optimization, or the like. In one exemplary embodiment, the third party is a computer which displays RT-BCDB 200 information for a system administrator person to use as required to improve system maintenance. In another exemplary embodiment, the third party is a software application that automatically implements improvements to system maintenance without external intervention.

Figure 3:
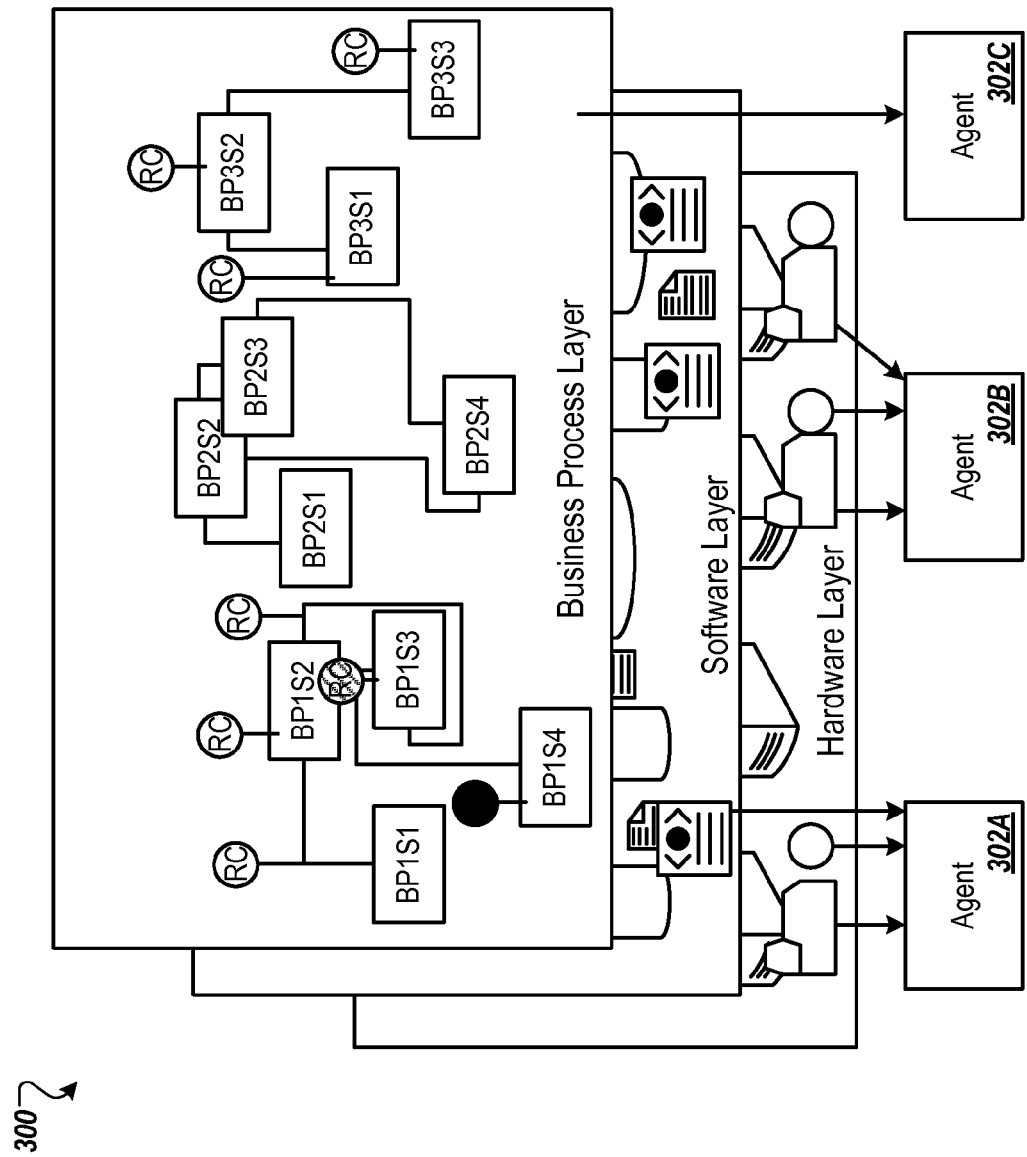
FIG. 3 shows an example of agents collecting information for a business case database.

FIG. 3 shows an example of agents collecting information for a business case database. Here, a multi-application landscape 300 can be similar or identical to the landscape 100 described above, and further includes agents 302 for collecting run-state information, application log files, application tools information, and/or system logs.

An agent 302 can collect information from one or more layers in the landscape 300. For example, an agent 302A can collect information from a hardware layer and/or from a software layer. Collected hardware information can reflect the status or operation of a server, a storage component, a network component, and/or of any other hardware component. Collected software information can reflect the status or operation of an application program, a database system, a tool, and/or of any other software feature. The collected software information could be obtained using a monitoring tool with an interface to check for intensive data load, monitor processes, prove parallelization, or provide information about execution of SQL statements, just to name a few examples. The agent 302B is here also shown to be collecting information from the software layer and can be an agent dedicated to this layer, to name just one example. Information collection in hardware and/or software layers can involve evaluation of XML files, plain log files or extracts of application tools. For example, an agent can inspect information sources in the respective layer and identify run-state information using pattern matching.

As another example, the agent 302C can collect information from at least the business process layer. Collected business process information can relate to operation or characteristics of an enterprise solution and/or process activities thereof, for example. Information collection in a business process layer can involve obtaining run states from one or more calls of run control commands in the application source code.

Figure 4:
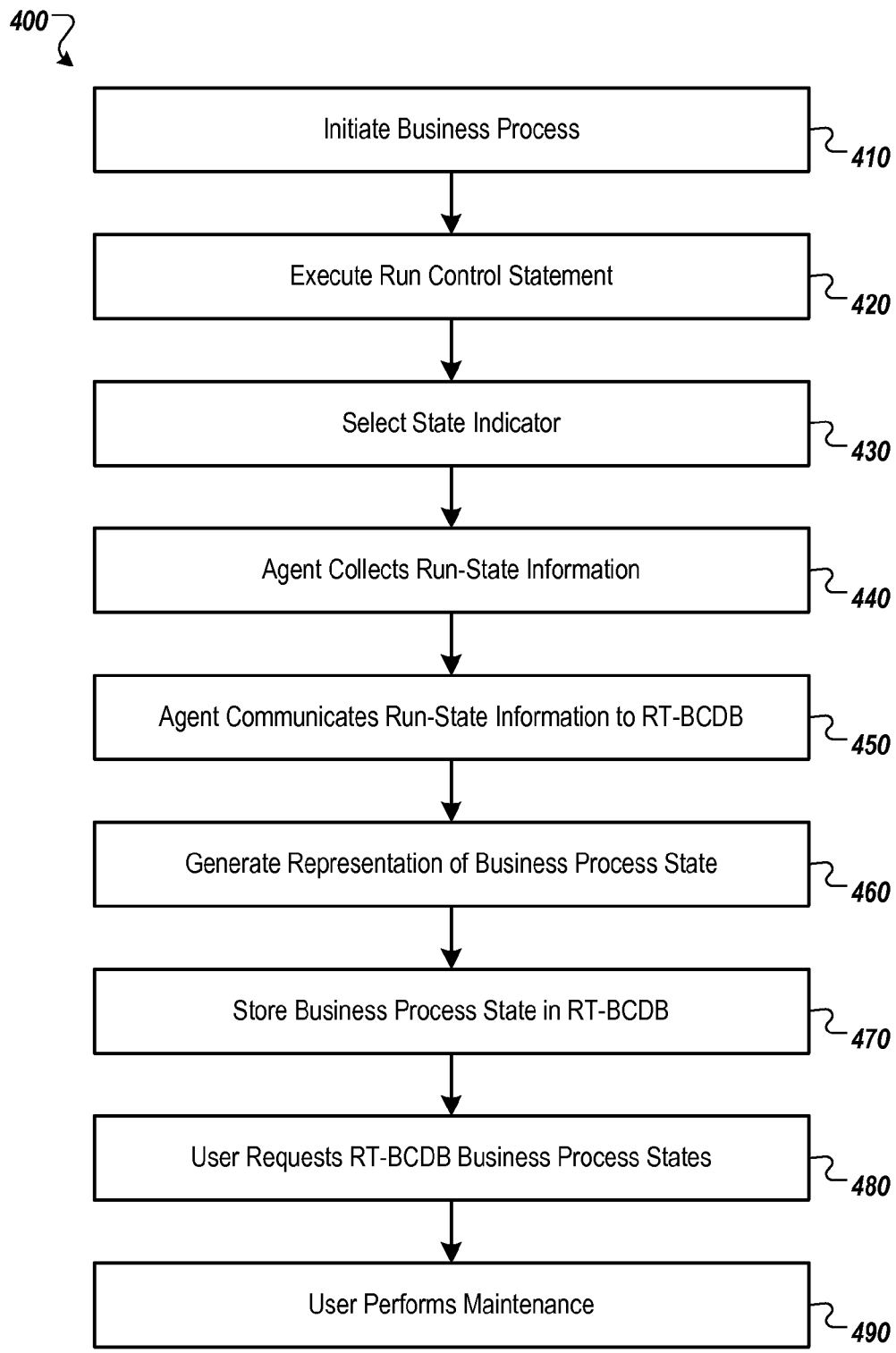
FIG. 4 shows a flow chart of an exemplary method.

Referring now to FIG. 4, a business process is initiated (step 410) in a multi-application computer system. For example, an employee in a business could initiate the processing of an invoice of an enterprise's product sale. The employee could initiate the invoice process by entering information about the product sale into an enterprise computer terminal. This invoice process could, for example, be represented at the business process layer 115 by business process 190 using business case 180 and process steps 140. The invoicing process could require the execution of one or more applications of the software layer 110 of the multi-application landscape 100. These applications could exercise one or more components of the hardware layer 105 of the multi-application landscape 100. For example, the applications could require server 120 to communicate with server 135 within the hardware layer 105.

Referring now to FIG. 4 and FIG. 5, run control statements are executed (step 420) after the business process is initiated. In one exemplary embodiment, run control statements are executed in association with process steps 140 of business process 190 at times where the business process 190 is subject to changing its state.

Next, state indicators associated with the executed run control statements are selected (step 430). The state indicators represent run-state information of the initiated business process. In an exemplary embodiment, the process step 140 of filling a purchase order could be executed and could result in the business process 190 being in a state of "active," "exception" or "successful," to name a few examples. That is, depending on where in the code execution is currently performed, a representative state indicator can be selected.

Next, an agent can collect the run-state information (step 440) as represented by the selected state indicators. For example, as described above in reference to FIG. 3, an agent 302 can collect run-state and other information from one or more layers in the landscape 300, for example by using pattern-matching. Referring again to FIG. 4, after collecting the run-state information the agent communicates the run-state information to a repository (step 450). For example, the agent could communicate the run-state information to the RT-BCDB 200 as described above in reference to FIG. 1 and FIG. 2.

Once the repository receives the run-state information, a representation of the business process state is generated (step 460). For example, referring to FIG. 2, a representation of the run-state information of process step 1 of business case 1 which terminated successfully could generate the representation of "BC1.PS1.1 success" 223 along with other exemplary representations.

Next, the business process state can be stored in the repository (step 470). In one exemplary embodiment, the generated representation of the business process state is stored in the RT-BCDB database. If the business process is active, for example, the representation could be stored in the active business cases table 240 of the RT-BCDB 200. Another example would be if the business process had terminated, in which case the representation could be stored in the run-time history table 230 of the RT-BCDB 200.

When the run-state information of the multi-application landscape's business processes is stored in the repository, a third party user can request the business process states from the repository (step 480). For example, the third party user could be a person reviewing the active business cases 240 and run-time history table 230 of the RT-BCDB 200 as displayed on a computer screen. The person could send a request to view the business process states by pressing a key on the computer, which in turn could cause a software command to be sent to the RT-BCDB API interface 250. In another example, the third party user requesting business process states could be another computer process, software application, or batch processing mechanism, to name a few. In this example, the request for business process state information could be automated.

After a request for the business process state information has been made as above, the third party user can perform maintenance (step 490) on the multi-application landscape. In the exemplary embodiment where the third party user is a person, the person could decide which business processes were in states needing maintenance and perform administrative tasks. These administrative tasks could include implementing recovery, optimization, scheduling, rebalancing of application loads, moving business cases 180, 185 to run at different times, updating and upgrading applications and business cases 180, 185, and indentifying potential failure situations, to name a few examples. In another embodiment where the request for information (step 480) was sent by an automated process, the administrative tasks (e.g., those mentioned above) could be performed by the automated process.

FIG. 5 shows an example of code 500 having a run control statement. In some implementations, one or more run control statements can be inserted in application source code to reflect the process state. For example, as the application code is executed, the run control statement upon execution can report the status of the application or the business process, and this information can be collected in a database.

Here, the application code includes a function call 502. For example, a function call can initiate a function that generates a purchase order in an ERP system. Here, the application also includes exception code 504 for handling an exceptional situation (e.g., when the function call 502 returns a nonzero code). For example, the exception code 504 can include a call to an "ExceptionHandling" routine.

Here, run control statements 506 have been inserted in the application code. A run control statement can be identified by a name (such as "RunControl") and can relate to a specific process step of a business process. When the run control statement is executed in that process step, the run control statement issues a predefined run state. The run state can be identified using a state indicator, for example any of the indicators "active," exception" and "successful" described here.

A run control statement 506A can be executed before the function call 502. The run control statement 506A relates to the process step "BC1.PS1," which can refer to process step number 1 of a business case number 1. When the run control statement 506A is executed, the run state is "active". That is, when program execution reaches the function call 502, but before the function call 502 is executed, the process step number 1 of the business case number 1 has an "active" state.

A run control statement 506B can be executed after the exception code 504. Like the run control statement 506A, the run control statement 506B relates to the process step "BC1.PS1," and when executed, the state of the process step number 1 of the business case number 1 is "exception". As indicated above, the exception can occur when the function call 502 returns a nonzero code.

A run control statement 506C can be executed after the function call 502 and, if applicable, the call to the "ExceptionHandling" routine. Like the previously described run control statements, the run control statement 506C relates to the process step "BC1.PS1," and when executed, indicates that the process step number 1 of the business case number 1 is "successful". Thus, the run control statement 506C when executed, whether after an exceptional or non-exceptional call of the PurchaseOrder function, can report that the process step has been successfully performed.

A run control statement can be inserted into source code by the developer of the application program or by another person with access to the source code. For example, in an interpreted language (such as COBOL, or the ABAP language used in systems from SAP AG), the source code can be made available also at a time after the initial application has been created, and the run control statement(s) can be inserted into the source code at such time. As another example, for a compiled language (such as C++) the run control statement would need to be inserted in the source code at the time the program is developed. Accordingly, an application developer who wishes the program to be compatible with information collection performed by agents or otherwise as described herein, can add the run control statements during the programming process.

Figure 6:
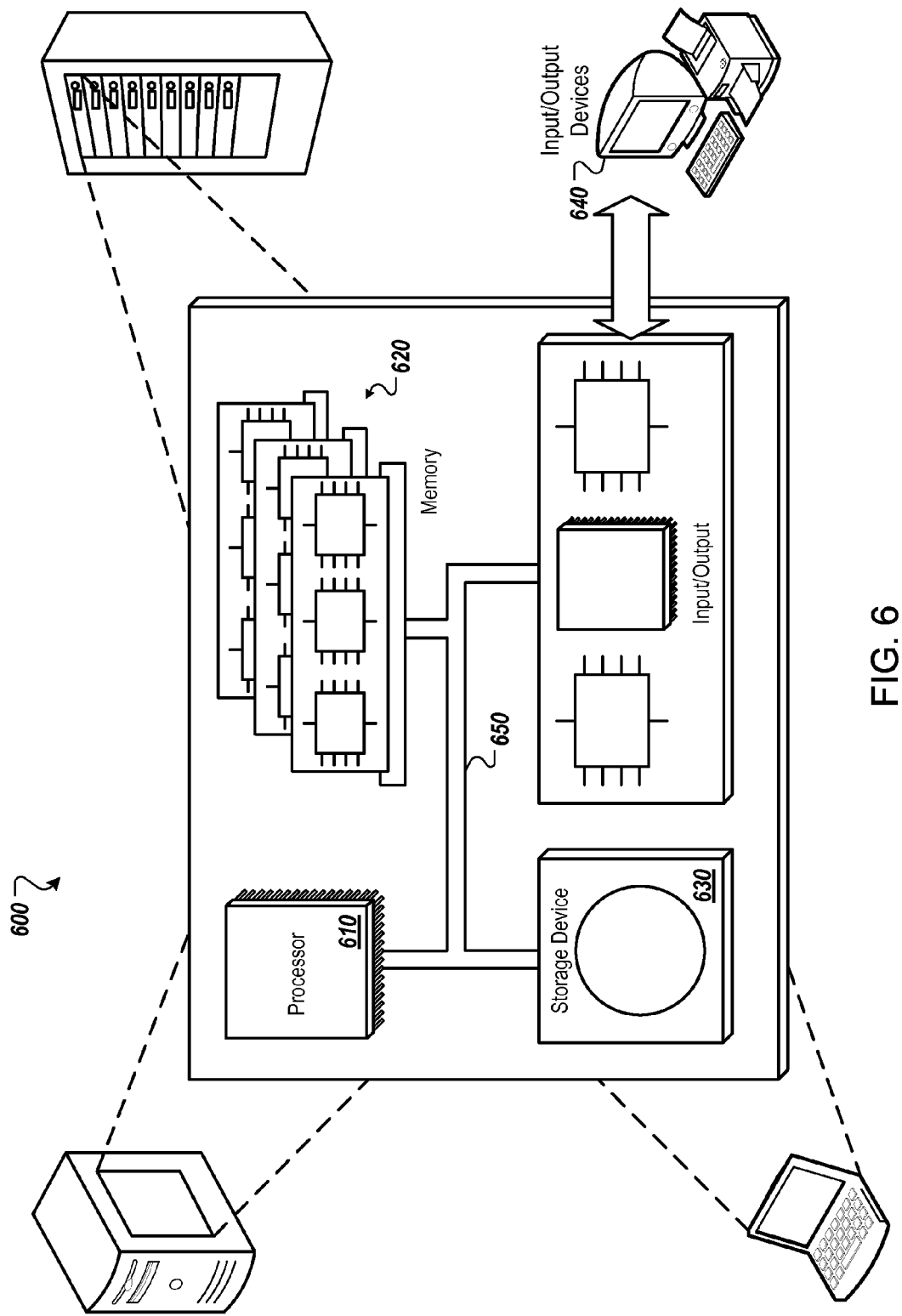
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for supporting administration of a multi-application landscape, the method comprising:
    initiating, in a multi-application computer system, a business process that (i) describes a procedure of activities to fulfill an enterprise task, (ii) involves executing business process steps in multiple applications and (iii) uses run control statements associated with the process steps of the business process where a business process state regarding the enterprise task is subject to change;
    executing the run control statements as part of performing the business process, wherein a first run control statement is executed before a function call, a second run control statement is executed if the function call returns an exception, and a third run control statement is executed after the function call and, if applicable, the second run control statement;
    for each run control statement being executed, selecting at least one of multiple state indicators associated with the run control statement, the state indicator representing run-state information of the business process; and
    generating a representation of the business process state regarding the enterprise task and storing the representation in a repository, the representation comprising (i) each state indicator selected in executing the run control statements, and (ii) an identifier for the process step where the business process state changed.

2. The computer-implemented method of claim 1, wherein the multi-application computer system comprises a hardware layer, a software layer, and a business process layer.

3. The computer-implemented method of claim 2, further comprising defining inter-dependencies of business cases associated with the business process layer, the business cases comprising multiple process steps and sub-process steps performed throughout the multi-application landscape to fulfill enterprise tasks.

4. The computer-implemented method of claim 2, wherein the run control statements are included in source code of applications of the software layer.

5. The computer-implemented method of claim 2, wherein the run control statements are included in a batch processing mechanism, the batch processing mechanism comprising starting and stopping applications of the software layer.

6. The computer-implemented method of claim 1, wherein the run-state information comprises a state and a time of the business process.

7. The computer-implemented method of claim 1, wherein the repository comprises a business case directory table, an active business case table, and a run-time history table.

8. The computer-implemented method of claim 7, wherein the business case directory table comprises representations of a process owner, a process unit, and a process dependency, the active business case table comprises representations of the state indicators and the identifiers for active business processes, and the run-time history table comprises representations of the run-state information of completed business processes.

9. The computer-implemented method of claim 1, wherein storing the representation in the repository comprises initiating an agent that collects the state indicators and sends the state indicators to the repository.

10. The computer-implemented method of claim 9, wherein the multi-application computer system comprises a hardware layer, a software layer, and a business process layer, and the agent collects the state indicators from at least one of the hardware layer, the software layer, and the business process layer.

11. The computer-implemented method of claim 10, wherein the agent evaluates at least one of XML, log files, and extracts of application tools from the hardware layer and the software layer, and receives the state indicators from a call of the run control statement from the business process layer.

12. The computer-implemented method of claim 1, further comprising monitoring the repository for business process state changes.

13. The computer-implemented method of claim 12, wherein the monitoring comprises displaying the representations of the business process states and performing maintenance on the multiple applications of the business process.

14. A computer program product tangibly embodied in a computer-readable storage medium and comprising instructions that when executed by a processor perform a method comprising:
   initiating, in a multi-application computer system, a business process that (i) describes a procedure of activities to fulfill an enterprise task, (ii) involves executing business process steps in multiple applications and (iii) uses run control statements associated with the process steps of the business process where a business process state regarding the enterprise task is subject to change;
   executing the run control statements as part of performing the business process, wherein a first run control statement is executed before a function call, a second run control statement is executed if the function call returns an exception, and a third run control statement is executed after the function call and, if applicable, the second run control statement;
   for each run control statement being executed, selecting at least one of multiple state indicators associated with the run control statement, the state indicator representing run-state information of the business process; and
   generating a representation of the business process state regarding the enterprise task and storing the representation in a repository, the representation comprising (i) each state indicator selected in executing the run control statements, and (ii) an identifier for the process step where the business process state changed.

15. The computer program product of claim 14, wherein the multi-application computer system comprises a hardware layer, a software layer, and a business process layer.

16. The computer program product of claim 15, the method further comprising defining inter-dependencies of business cases associated with the business process layer, the business cases comprising multiple process steps and sub-process steps performed throughout the multi-application landscape to fulfill enterprise tasks.

17. The computer program product of claim 15, wherein the run control statements are included in source code of applications of the software layer.

18. The computer program product of claim 15, wherein the run control statements are included in a batch processing mechanism, the batch processing mechanism comprising starting and stopping applications of the software layer.

19. The computer program product of claim 14, wherein the repository comprises a business case directory table, an active business case table, and a run-time history table.

20. The computer program product of claim 19, wherein the business case directory table comprises representations of a process owner, a process unit, and a process dependency, the active business case table comprises representations of the state indicators and the identifiers for active business processes, and the run-time history table comprises representations of the run-state information of completed business processes.

* * * * *